United States Patent
Douady et al.

(10) Patent No.: US 11,812,159 B2
(45) Date of Patent: *Nov. 7, 2023

(54) HIGH DYNAMIC RANGE PROCESSING BASED ON ANGULAR RATE MEASUREMENTS

(71) Applicant: GoPro, Inc., San Mateo, CA (US)

(72) Inventors: Bruno César Douady, Orsay (FR); Hervé Hornung, Achères (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,630

(22) Filed: Sep. 23, 2022

(65) Prior Publication Data
US 2023/0020755 A1  Jan. 19, 2023

Related U.S. Application Data

(63) Continuation of application No. 17/354,724, filed on Jun. 22, 2021, now Pat. No. 11,457,157, which is a (Continued)

(51) Int. Cl.
*H04N 23/741* (2023.01)
*H04N 23/73* (2023.01)
*H04N 23/68* (2023.01)

(52) U.S. Cl.
CPC ......... *H04N 23/741* (2023.01); *H04N 23/683* (2023.01); *H04N 23/6812* (2023.01); *H04N 23/6845* (2023.01); *H04N 23/73* (2023.01)

(58) Field of Classification Search
CPC ............. H04N 23/683; H04N 23/6812; H04N 23/6845; H04N 23/73; H04N 23/741
See application file for complete search history.

(56) References Cited

U.S. PATENT DOCUMENTS 8,031,240 B2  10/2011 Yumiki
8,081,225 B2  12/2011 Inaba
(Continued)

FOREIGN PATENT DOCUMENTS

CN  103945145 A  7/2014
CN  107925726 A  4/2018

OTHER PUBLICATIONS

Andrew Adams et al: "The Frankencamera: An Experimental Platform for Computational Photography", ACM Transactions on Graphics, ACM, 2 Penn Plaza, Suite 701, New York, NY, 10121-0701, USA, vol. 29, No. 4, Jul. 26, 2010 (Jul. 26, 2010), pp. 1-12, XP058157916, ISSN: 0730-0301, DOI: 10.1145/1778765.1778766.
(Continued)

*Primary Examiner* — Marly S Camargo
(74) *Attorney, Agent, or Firm* — Young Basile Hanlon & MacFarlane, P.C.

(57) ABSTRACT

Systems and methods are disclosed for high dynamic rate processing based on angular rate measurements. For example, methods may include receiving a short exposure image that was captured using an image sensor; receiving a long exposure image that was captured using the image sensor; receiving an angular rate measurement captured using an angular rate sensor attached to the image sensor during exposure of the long exposure image; determining, based on the angular rate measurement, whether to apply high dynamic range processing to an image portion of the short exposure image and the long exposure image; and responsive to a determination not to apply high dynamic range processing to the image portion, selecting the image portion of the short exposure image for use as the image portion of an output image and discard the image portion of the long exposure image.

20 Claims, 11 Drawing Sheets

Related U.S. Application Data continuation of application No. 16/813,016, filed on Mar. 9, 2020, now Pat. No. 11,050,946, which is a continuation of application No. 16/240,050, filed on Jan. 4, 2019, now Pat. No. 10,587,816.

(56) References Cited

U.S. PATENT DOCUMENTS

| | | | |
|---|---|---|---|
| 8,111,294 B2 | 2/2012 | Bourgain | |
| 8,576,289 B2 | 11/2013 | Ishii | |
| 8,964,040 B2 | 2/2015 | Tico | |
| 9,516,237 B1 | 12/2016 | Goyal | |
| 9,544,505 B2 | 1/2017 | Tsuzuki | |
| 10,587,816 B1 | 3/2020 | Douady | |
| 10,721,415 B2 | 7/2020 | Wang | |
| 10,728,474 B2 | 7/2020 | Douady | |
| 10,863,097 B2 * | 12/2020 | Gandhi | H04N 23/45 |
| 11,040,946 B2 | 6/2021 | Sukumaran | |
| 11,050,946 B2 | 6/2021 | Douady | |
| 11,303,628 B2 * | 5/2022 | Gandhi | H04N 23/62 |
| 11,457,157 B2 * | 9/2022 | Douady | H04N 23/73 |
| 2010/0295961 A1 | 11/2010 | Terauchi | |
| 2015/0296116 A1 | 10/2015 | Tsuzuki | |
| 2015/0312464 A1 | 10/2015 | Peng | |
| 2017/0289515 A1 | 10/2017 | Li | |
| 2018/0124343 A1 | 5/2018 | Vogelsang | |
| 2019/0108622 A1 | 4/2019 | Douady-Pleven | |
| 2019/0297283 A1 | 9/2019 | Douady | |
| 2020/0068138 A1 * | 2/2020 | Gandhi | H04N 23/45 |
| 2020/0221010 A1 | 7/2020 | Douady | |
| 2021/0392259 A1 | 12/2021 | Douady | |

OTHER PUBLICATIONS

International Preliminary Report on Patentability for App. No. PCT/US2020/012026, dated Jun. 16, 2021, 8 pages.

International Search Report and Written Opinion for Application No. PCT/US2020/012026, dated Mar. 16, 2020, 13 pages.

Wikipedia, High-dynamic-range imaging; URL: https://en.wikipedia.org/wiki/High-dynamic-range_imaging, Retrieved on Jan. 11, 2019, 10 pages.

* cited by examiner

HIGH DYNAMIC RANGE PROCESSING BASED ON ANGULAR RATE MEASUREMENTS

CROSS REFERENCE TO RELATED APPLICATION(S)

This application is a continuation of U.S. application Ser. No. 17/354,724, filed Jun. 22, 2021, which is a continuation of U.S. application Ser. No. 16/813,016, filed Mar. 9, 2020, now Pat. No. 11,050,946, which is a continuation of U.S. application Ser. No. 16/240,050, filed Jan. 4, 2019, now U.S. Pat. No. 10,587,816, the contents of which are incorporated by reference in their entirety.

TECHNICAL FIELD

This disclosure relates to high dynamic rate processing based on angular rate measurements.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, a short exposure image and a corresponding long exposure image of a scene are combined using high dynamic range (HDR) processing to determine an output image with a larger dynamic range than the short exposure image and the long exposure image individually.

SUMMARY

Disclosed herein are implementations of high dynamic rate processing based on angular rate measurements.

In a first aspect, the subject matter described in this specification can be embodied in systems that include an image sensor configured to capture images, an angular rate sensor that is attached to image sensor and configured to measure changes in orientation of the image sensor, and a processing apparatus configured to: receive a short exposure image that was captured using the image sensor; receive a long exposure image that was captured using the image sensor, wherein the long exposure image was captured with a longer exposure time than the short exposure image; receive an angular rate measurement captured using the angular rate sensor during exposure of the long exposure image; and determine, based on the angular rate measurement, whether to apply high dynamic range processing to an image portion of the short exposure image and the long exposure image.

In a second aspect, the subject matter described in this specification can be embodied in methods that include receiving a short exposure image that was captured using an image sensor; receiving a long exposure image that was captured using the image sensor, wherein the long exposure image was captured with a longer exposure time than the short exposure image; receiving an angular rate measurement captured using an angular rate sensor attached to the image sensor during exposure of the long exposure image; determining, based on the angular rate measurement, whether to apply high dynamic range processing to an image portion of the short exposure image and the long exposure image; and, responsive to a determination not to apply high dynamic range processing to the image portion, selecting the image portion of the short exposure image for use as the image portion of an output image and discard the image portion of the long exposure image.

In a third aspect, the subject matter described in this specification can be embodied in a non-transitory computer-readable storage medium. The non-transitory computer-readable storage medium may include executable instructions that, when executed by a processor, cause performance of operations, including receiving a short exposure image that was captured using an image sensor; receiving a long exposure image that was captured using the image sensor, wherein the long exposure image was captured with a longer exposure time than the short exposure image; receiving an angular rate measurement captured using an angular rate sensor attached to the image sensor during exposure of the long exposure image; determining, based on the angular rate measurement, whether to apply high dynamic range processing to an image portion of the short exposure image and the long exposure image; and, responsive to a determination not to apply high dynamic range processing to the image portion, selecting the image portion of the short exposure image for use as the image portion of an output image and discard the image portion of the long exposure image.

In a fourth aspect, the subject matter described in this specification can be embodied in systems that include an image sensor configured to capture images, an angular rate sensor that is attached to image sensor and configured to measure changes in orientation of the image sensor, and a processing apparatus configured to: receive a short exposure image that was captured using the image sensor; receive a long exposure image that was captured using the image sensor, wherein the long exposure image was captured with a longer exposure time than the short exposure image; receive an angular rate measurement captured using the angular rate sensor during exposure of the long exposure image; select, based on the angular rate measurement, whether to use an image portion of the short exposure image or the long exposure image; and determine the image portion of an output image based on the image portion of the selected image.

In a fifth aspect, the subject matter described in this specification can be embodied in methods that include receiving a short exposure image that was captured using an image sensor; receiving a long exposure image that was captured using the image sensor, wherein the long exposure image was captured with a longer exposure time than the short exposure image; receiving an angular rate measurement captured using an angular rate sensor during exposure of the long exposure image; selecting, based on the angular rate measurement, whether to use an image portion of the short exposure image or the long exposure image; and determining the image portion of an output image based on the image portion of the selected image.

In a sixth aspect, the subject matter described in this specification can be embodied in a non-transitory computer-readable storage medium. The non-transitory computer-readable storage medium may include executable instructions that, when executed by a processor, cause performance of operations, including receiving a short exposure image that was captured using an image sensor; receiving a long exposure image that was captured using the image sensor, wherein the long exposure image was captured with a longer exposure time than the short exposure image; receiving an angular rate measurement captured using an angular rate sensor during exposure of the long exposure image; selecting, based on the angular rate measurement, whether to use an image portion of the short exposure image or the long exposure image; and determining the image portion of an output image based on the image portion of the selected image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
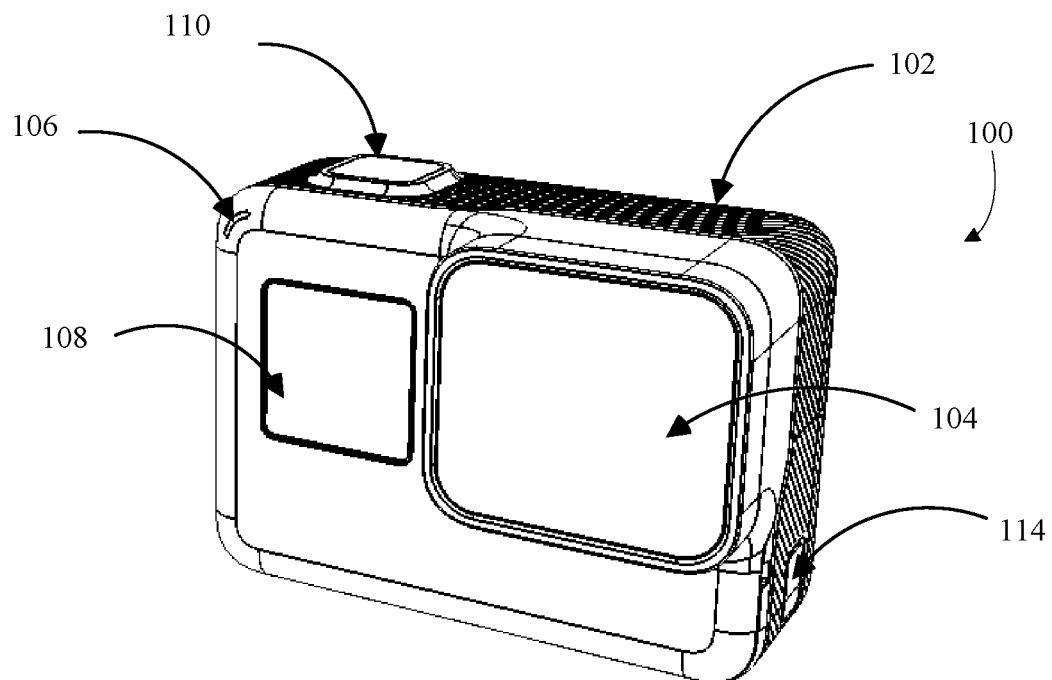
FIGS. 1A-D are isometric views of an example of an image capture device.
Figure 1B:
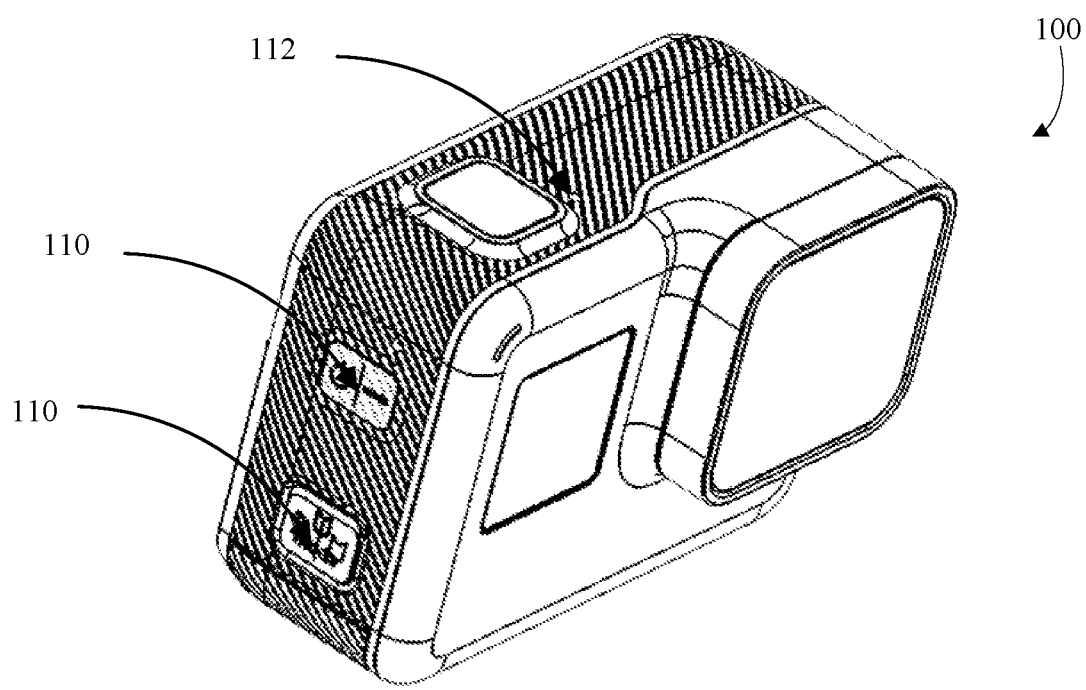
Figure 1C:
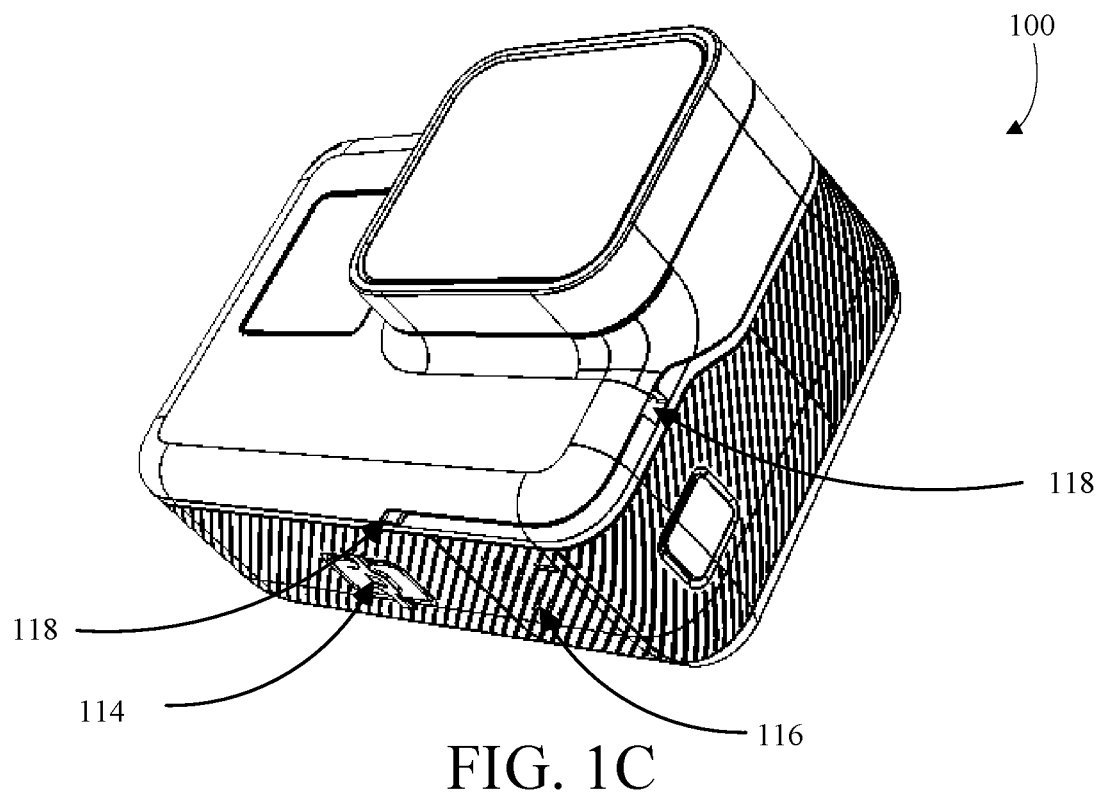
Figure 1D:
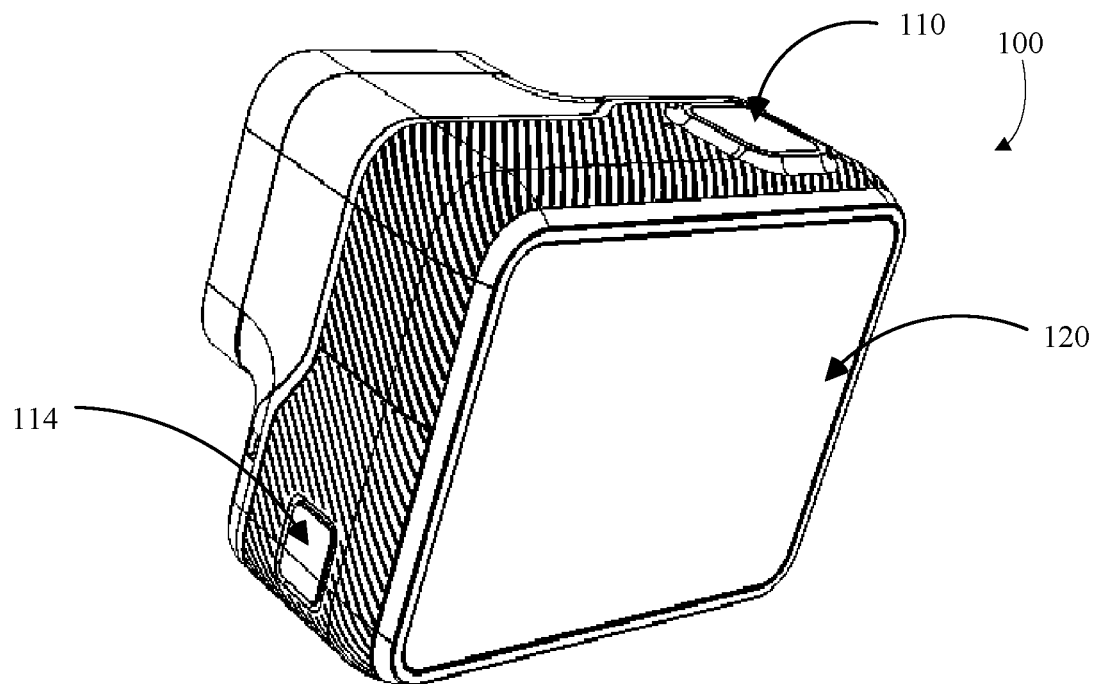

Systems and methods for high dynamic rate processing based on angular rate measurements are described herein. When shooting a video, high dynamic range (HDR) processing may be used to improve video quality by combining two input images of roughly the same scene with different exposure durations to effectively increase the dynamic range of an output image compared to the input images. When performing image fusion for HDR processing, the motion blur of the underexposed and overexposed images are different. The larger one may be so large that it may be better to avoid using the overexposed image at all. However, in some cases, video HDR cannot be afforded because the HDR processing is not available at the required level of performance, but two frames can be captured for each frame of the video. The problem is to leverage this capability to capture two frames per output frame to improve image quality.

For example, a global approach for a whole image or a local approach may be used. Globally, if an angular rate sensor (e.g., a gyroscope) attached to the image sensor used to capture the images indicates that the overexposed image is too blurry, the underexposed image may be used exclusively, even if it is noisy. Locally, a similar decision (use or do not use overexposed image) can be taken on a pixel-by-pixel or block-by-block basis.

For example, during video capture, an auto-exposure module of an image capture device (e.g., a camera) may generate a gain and an exposure time for each frame of video. The auto-exposure module may be configured to generate two possible gain/exposure time pairs. Then an analysis of the content of the scene and of angular rate data (e.g., from a gyroscope of the image capture device) may be used to choose between the two exposure times. This technique may be more effective if digital overlap high dynamic range (DOL-HDR) sensors are used as both frames have the correct time stamp (or a reasonably correct time stamp). In some implementations, even if HDR processing is available, an analysis of the angular rate data and scene content can be carried out to decide whether HDR processing brings value or if the short exposure time image should be used exclusively.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LED display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
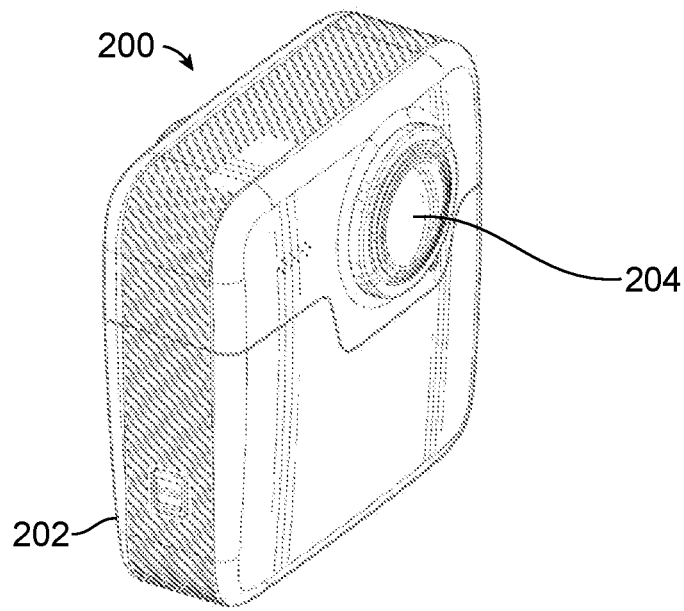
FIGS. 2A-B are isometric views of another example of an image capture device.
Figure 2B:
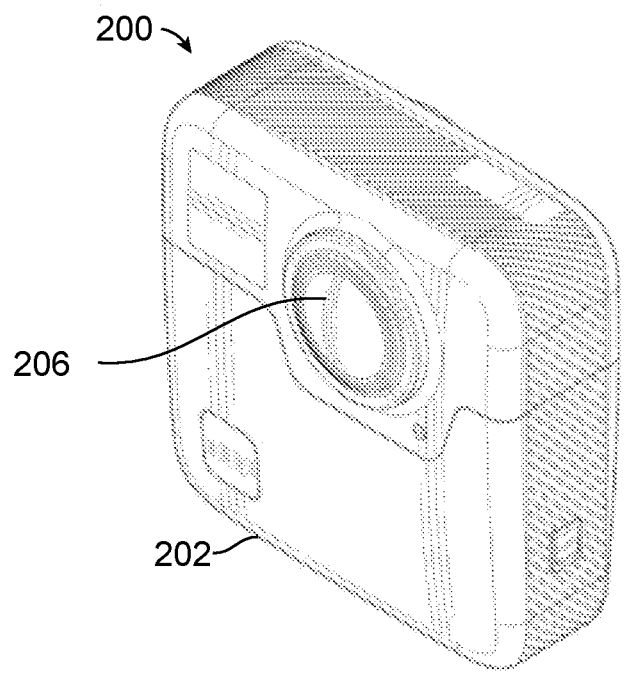

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
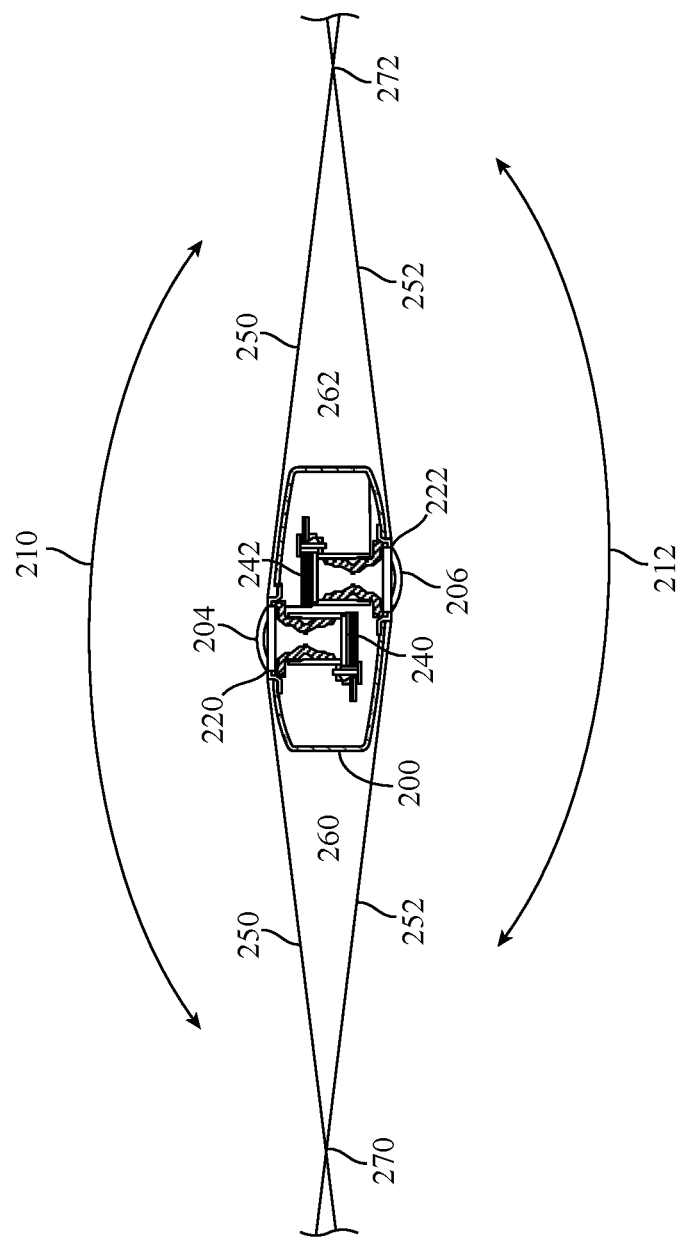
FIG. 2C is a cross-sectional view of the image capture device of FIGS. 2A-B.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3B:
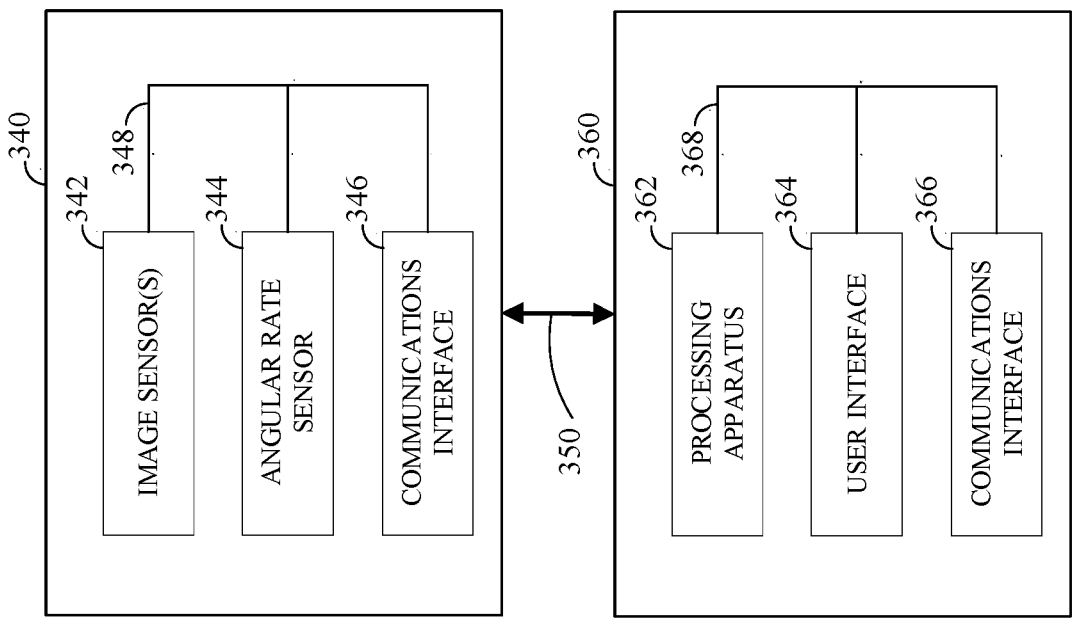
FIGS. 3A-B are block diagrams of examples of image capture systems.
Figure 3A:
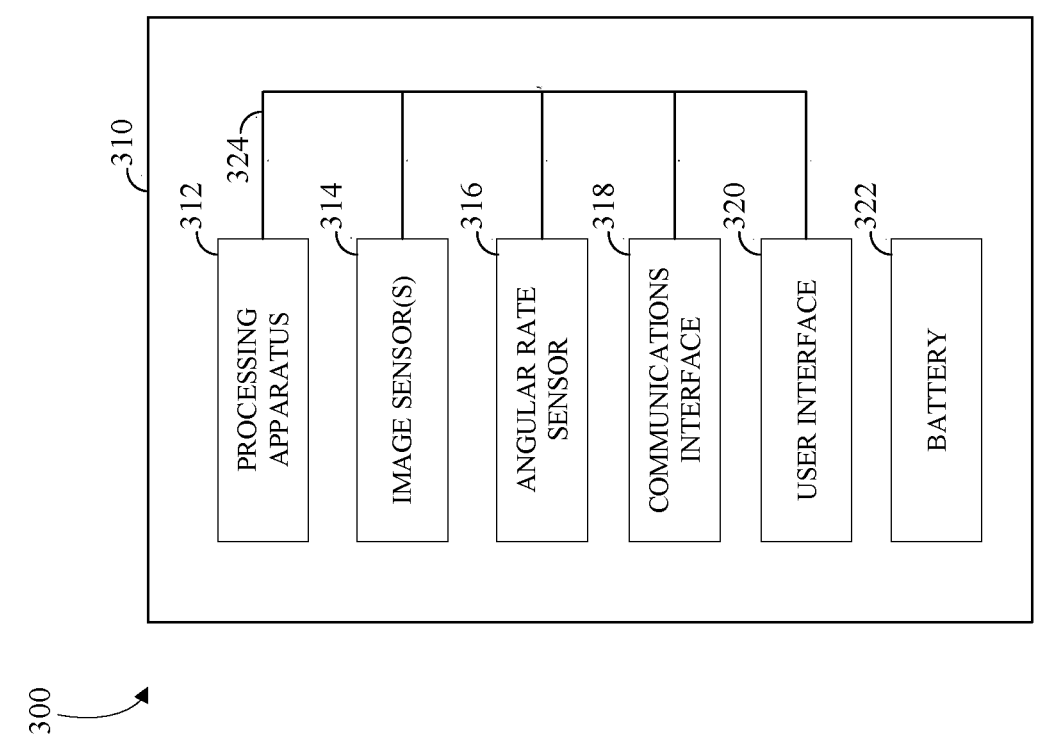

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive images captured using one or more image sensors 314 and receive angular rate measurements captured using an angular rate sensor 316. The processing apparatus 312 may be configured to perform image signal processing (e.g., filtering, tone mapping, stitching, and/or encoding) to generate output images based on image data from the one or more image sensors 314. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random-access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The one or more image sensors 314 may be configured to detect light of a certain spectrum (e.g., the visible spectrum or the infrared spectrum) and convey information constituting an image as electrical signals (e.g., analog or digital signals). For example, the one or more image sensors 314 may include CCDs or active pixel sensors in a CMOS. The one or more image sensors 314 may detect light incident through a respective lens (e.g., a fisheye lens). In some implementations, the one or more image sensors 314 include digital-to-analog converters. In some implementations, the one or more image sensors 314 are held in a fixed orientation with respective fields of view that overlap.

The angular rate sensor 316 may be attached to the one or more image sensors 314 and configured to measure changes in orientation of the one or more image sensors 314. For example, the angular rate sensor 316 and the one or more image sensors 314 may be attached via rigid structures of the image capture device 310. For example, the angular rate sensor 316 and the one or more image sensors 314 may be attached via a printed circuit board on which they are both soldered. For example, the angular rate sensor 316 may include one or more gyroscopes (e.g., a tri-axial gyroscope). For example, angular rate sensor 316 may include an inertial measurement unit. For example, angular rate sensor 316 may output angular rate measurements (e.g., three-axis angular rate measurements in degrees per second) or measurement data from which angular rate measurements can be derived (e.g., quaternions representing an instantaneous estimate of an orientation or pose of the image capture device 310 including the one or more image sensors 314).

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 6:
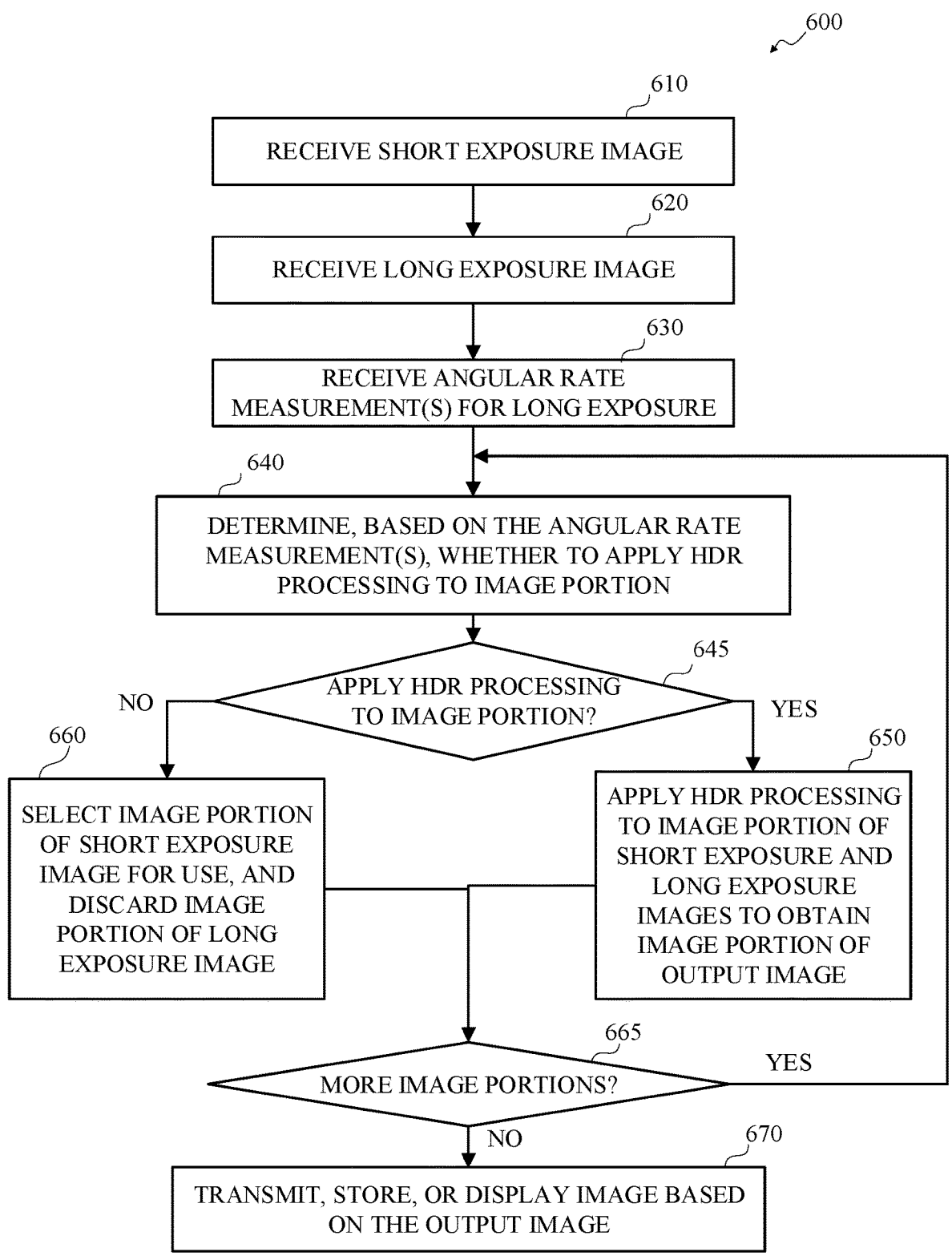
FIG. 6 is flowchart of an example of a process for selectively applying high dynamic range processing based on angular rate measurements.
Figure 8:
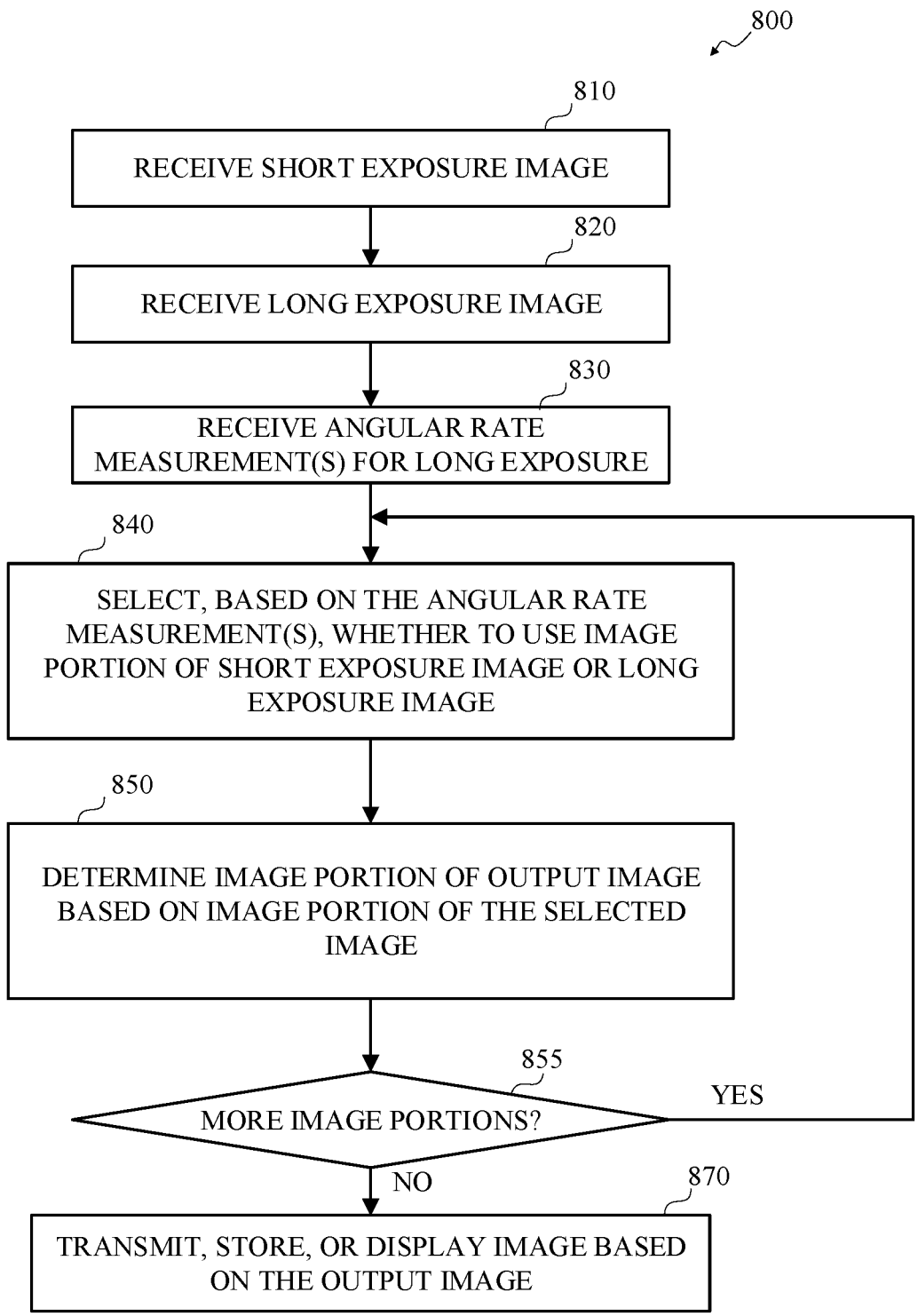
FIG. 8 is flowchart of an example of a process for selecting an exposure duration based on angular rate measurements.

The image capture system 300 may implement some or all of the processes described in this disclosure, such as the process 600 described of FIG. 6 or the process 800 described of FIG. 8.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes one or more image sensors 342 that are configured to capture images. The image capture device 340 includes an angular rate sensor 344 that is configured to capture angular rate measurements. The image capture device 340 includes a communications interface 346 configured to transfer images via the communication link 350 to the personal computing device 360.

The personal computing device 360 includes a processing apparatus 362 that is configured to receive, using the communications interface 366, images captured using the one or more image sensors 342 and measurement data captured using the angular rate sensor 344. The processing apparatus 362 may be configured to perform image signal processing (e.g., filtering, tone mapping, stitching, and/or encoding) to generate output images based on image data from the image sensors 342.

The one or more image sensors 342 are configured to detect light of a certain spectrum (e.g., the visible spectrum or the infrared spectrum) and convey information constituting an image as electrical signals (e.g., analog or digital signals). For example, the one or more image sensors 342 may include CCDs or active pixel sensors in a CMOS. The one or more image sensors 342 may detect light incident through a respective lens (e.g., a fisheye lens). In some implementations, the one or more image sensors 342 include digital-to-analog converters. In some implementations, the one or more image sensors 342 are held in a fixed relative orientation with respective fields of view that overlap. Image signals from the one or more image sensors 342 may be passed to other components of the image capture device 340 via a bus 348.

The angular rate sensor 344 may be attached to the one or more image sensors 342 and configured to measure changes in orientation of the one or more image sensors 342. For example, the angular rate sensor 344 and the one or more image sensors 342 may be attached via rigid structures of the image capture device 340. For example, the angular rate sensor 344 and the one or more image sensors 342 may be attached via a printed circuit board on which they are both soldered. For example, the angular rate sensor 344 may include one or more gyroscopes (e.g., a tri-axial gyroscope). For example, angular rate sensor 344 may include an inertial measurement unit. For example, angular rate sensor 344 may output angular rate measurements (e.g., three-axis angular rate measurements in degrees per second) or measurement data from which angular rate measurements can be derived (e.g., quaternions representing an instantaneous estimate of an orientation or pose of the image capture device 340 including the one or more image sensors 342). Angular rate measurement data from the angular rate sensor 344 may be passed to other components of the image capture device 340 via the bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the one or more image sensors 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the processes described in this disclosure, such as the process 600 of FIG. 6 .or the process 800 of FIG. 8.

Figure 4:
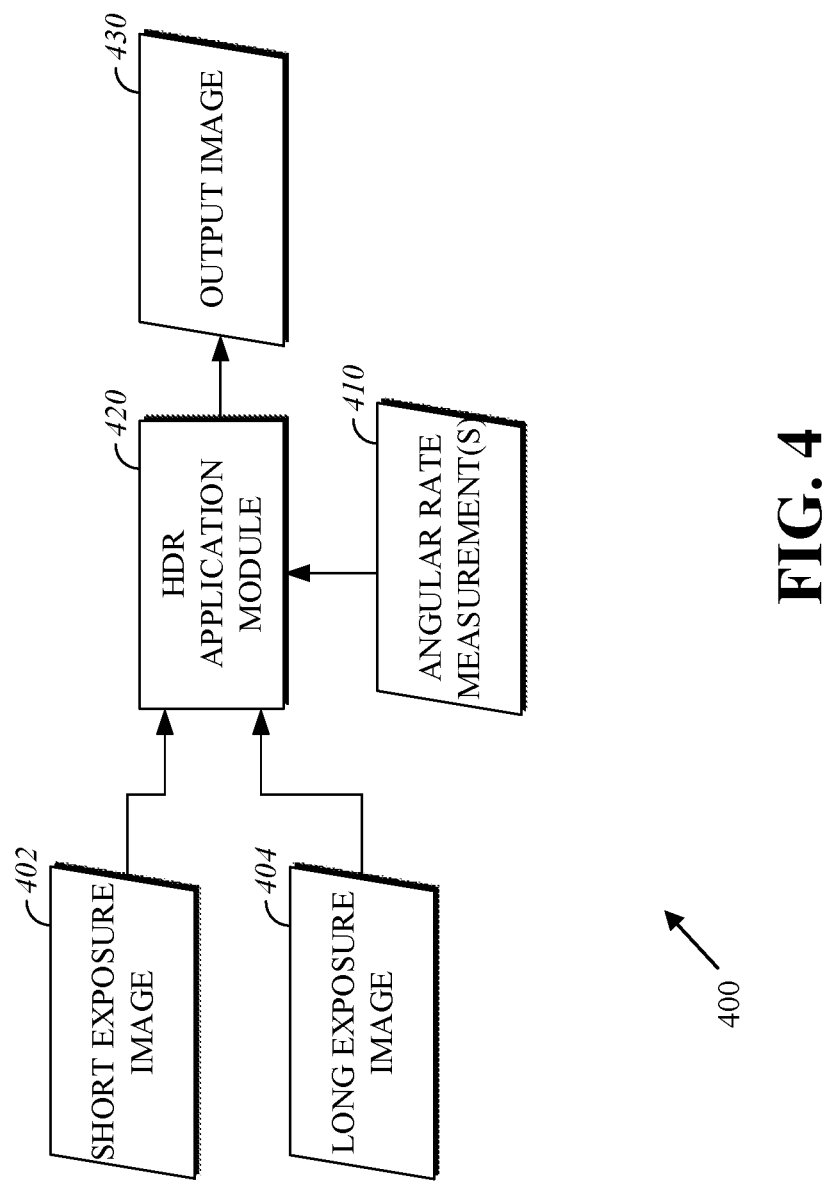
FIG. 4 is block diagram of an example of a system for selectively applying high dynamic range processing based on angular rate measurements.

FIG. 4 is block diagram of an example of a system 400 for selectively applying high dynamic range processing based on angular rate measurements. The system 400 is configured to take a short exposure image 402 captured using an image sensor (e.g., the one or more image sensors 314 or the one or more image sensors 342), a long exposure image 404 captured using the image sensor, and one or more angular rate measurements 410 captured during exposure of the long exposure image 404 as inputs. The system 400 includes a high dynamic range (HDR) application module 420 that is configured to selectively apply high dynamic range processing to the short exposure image 402 and the long exposure image 404 to obtain an output image 430 with a larger dynamic range than the short exposure image. The high dynamic range application module 420 may be configured to determine the output image 430 based on the short exposure image 402, or based on the short exposure image 402 and the long exposure image 404, depending on the one or more angular rate measurements 410. For example, the system 400 may leverage HDR processing when an image capture device is relatively still and disable HDR processing when image capture device motion is likely to have caused significant blur in the long exposure image 404. For example, the system 400 may be configured to implement the process 600 of FIG. 6. For example, the system 400 may be implemented as hardware and/or software of a processing apparatus (e.g., the processing apparatus 312 or the processing apparatus 362). In some implementations, a processing apparatus (e.g., the processing apparatus 312) that includes the system 400 is attached to the image sensor (e.g., the one or more image sensors 314).

For example, the high dynamic range application module 420 may be configured to receive (e.g., via the bus 324 or the communications link 350) a short exposure image 402 that was captured using an image sensor (e.g., the one or more image sensors 314 or the one or more image sensors 342), and receive a long exposure image 404 that was captured using the image sensor. The long exposure image 404 was captured with a longer exposure time than the short exposure image 402. The high dynamic range application module 420 may be configured to receive (e.g., via the bus 324 or the communications link 350) an angular rate measurement 410 captured using an angular rate sensor (e.g., the angular rate sensor 316 or the angular rate sensor 344) during exposure of the long exposure image 404. The angular rate sensor may be attached to the image sensor and configured to measure changes in orientation of the image sensor. The high dynamic range application module 420 may be configured to determine, based on the angular rate measurement 410, whether to apply high dynamic range processing to an image portion of the short exposure image 402 and the long exposure image 404. In some implementations, a blur metric for the image portion (e.g., a block of pixels or the entire image) may be determined based on the angular rate measurement 410, and the blur metric may be used to determine whether to apply high dynamic range processing to the image portion. For example, the process 700 of FIG. 7 may be implemented to determine, based on the angular rate measurement 410, whether to apply high dynamic range processing to one or more image portion of the short exposure image 402 and the long exposure image 404. For example, the image portion may be a block of one or more pixels that corresponds to less than a whole image. In some implementations, the image portion corresponds to a whole image, and the determination of whether to apply high dynamic range processing is for the whole image.

The high dynamic range application module 420 may be configured to, responsive to a determination not to apply high dynamic range processing to the image portion, select the image portion of the short exposure image 402 for use as the image portion of an output image 430 and discard the image portion of the long exposure image 404. The high dynamic range application module 420 may be configured to, responsive to a determination to apply high dynamic range processing to the image portion, apply high dynamic range processing to combine the image portion of the short exposure image 402 with the image portion of the long exposure image 404 based on pixel values in the image portion of the long exposure image 404 to obtain the image portion of the output image 430. For example, pixels of the long exposure image 404 that are saturated may be replaced by corresponding pixels of the short exposure image 402 in the output image 430, and pixels of the output image 430 may be determined based on corresponding pixels of the long exposure image 404 where those pixels of the long exposure image 404 are not saturated.

Figure 5:
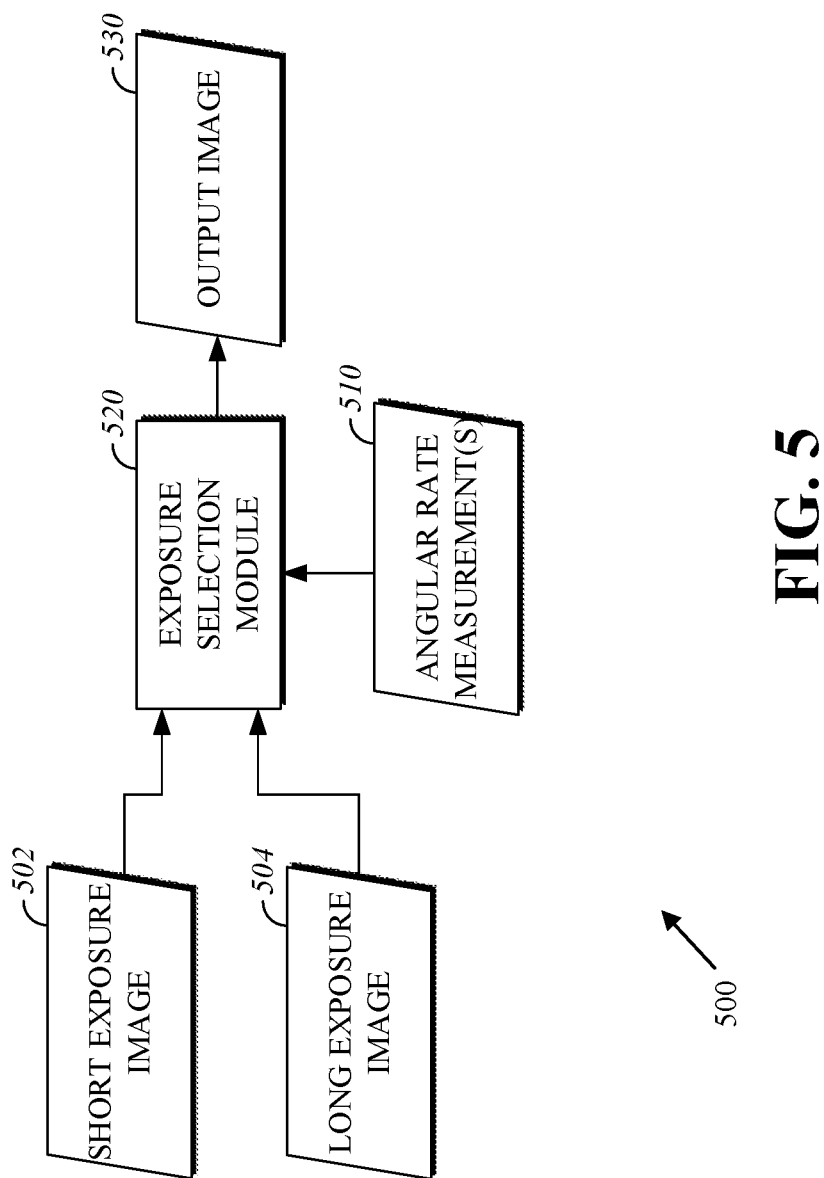
FIG. 5 is block diagram of an example of a system for selecting an exposure duration based on angular rate measurements.

FIG. 5 is block diagram of an example of a system 500 for selecting an exposure duration based on angular rate measurements. The system 500 is configured to take a short exposure image 502 captured using an image sensor (e.g., the one or more image sensors 314 or the one or more image sensors 342), a long exposure image 504 captured using the image sensor, and one or more angular rate measurements 510 captured during exposure of the long exposure image 504 as inputs. The system 500 includes an exposure selection module 520 that is configured to select, based on the one or more angular rate measurements 510, between the short exposure image 502 and the long exposure image 504 to obtain an output image 530. The exposure selection module 520 may be configured to determine the output image 530 based on the short exposure image 502, or based on the long exposure image 504, depending on the one or more angular rate measurements 510. For example, the system 500 may use the long exposure image 504 when an image capture device is relatively still or may use the short exposure image 502 when image capture device motion is likely to have caused significant blur in the long exposure image 504. For example, whether to use the short exposure image 502 or the long exposure image 504 may be global decision for the entire output image 530. In some implementations, whether to use the short exposure image 502 or the long exposure image 504 may be determined as a set of local decisions for different portions (e.g., pixels or blocks of pixels) of the output image 530. For example, the system 500 may be configured to implement the process 800 of FIG. 8. For example, the system 500 may be implemented as hardware and/or software of a processing apparatus (e.g., the processing apparatus 312 or the processing apparatus 362). In some implementations, a processing apparatus (e.g., the processing apparatus 312) that includes the system 500 is attached to the image sensor (e.g., the one or more image sensors 314).

For example, the exposure selection module 520 may be configured to receive (e.g., via the bus 324 or the communications link 350) a short exposure image 502 that was captured using an image sensor (e.g., the one or more image sensors 314 or the one or more image sensors 342), and receive a long exposure image 504 that was captured using the image sensor. The long exposure image 504 was captured with a longer exposure time than the short exposure image 502. The exposure selection module 520 may be configured to receive (e.g., via the bus 324 or the communications link 350) an angular rate measurement 510 captured using an angular rate sensor (e.g., the angular rate sensor 316 or the angular rate sensor 344) during exposure of the long exposure image 504. The angular rate sensor may be attached to the image sensor and configured to measure changes in orientation of the image sensor. The exposure selection module 520 may be configured to select, based on the angular rate measurement 510, whether to use an image portion (e.g., a pixel or a block of pixels) of the short exposure image 502 or the long exposure image 504. In some implementations, the image portion is a block of one or more pixels that corresponds to less than a whole image. In some implementations, the image portion corresponds to a whole image (e.g., the selection is made globally for the whole image). For example, selecting between the short exposure image 502 and the long exposure image 504 may include determining a blur metric for the image portion based on the angular rate measurement 510, determining a noise estimate for the image portion of the short exposure image 502, comparing the blur metric to the noise estimate, and, based on comparison of the blur metric and the noise estimate, selecting the short exposure image 502 (or the long exposure image 504) for use in the image portion of the output image. In some implementations, the noise estimate depends on an exposure duration of the short exposure image 502 and one or more pixel values of the image portion of the short exposure image 502. For example, the process 900 of FIG. 9 may be implemented to select, based on the angular rate measurement 510, whether to use an image portion of the short exposure image 502 or the long exposure image 504. Once the selection has been made for image portion, the exposure selection module 520 may be configured to determine the image portion of an output image 530 based on the image portion of the selected image (i.e., either the short exposure image 502 or the long exposure image 504).

FIG. 6 is flowchart of an example of a process 600 for selectively applying high dynamic range processing based on angular rate measurements. The process 600 includes receiving 610 a short exposure image that was captured using an image sensor; receiving 620 a long exposure image that was captured using the image sensor; receiving 630 an angular rate measurement captured using an angular rate sensor attached to the image sensor during exposure of the long exposure image; determining 640, based on the angular rate measurement, whether to apply high dynamic range processing to an image portion of the short exposure image and the long exposure image; and, responsive to a determination to apply high dynamic range processing to the image portion, applying 650 high dynamic range processing to the image portion of the short exposure image and the long exposure image to obtain the image portion of the output image, or, responsive to a determination not to apply high dynamic range processing to the image portion, selecting 660 the image portion of the short exposure image for use as the image portion of an output image and discard the image portion of the long exposure image. For example, the determination of whether to apply high dynamic range processing may be made for one or more image portions (e.g., pixels or blocks of pixels) of the images. The process 600 includes transmitting, storing, or displaying 670 an image based on the output image. For example, the process 600 may be implemented using the image capture system 300 of FIG. 3A. For example, the process 600 may be implemented using the image capture system 330 of FIG. 3B. For example, the process 600 may be implemented using the system 400 of FIG. 4.

The process 600 includes receiving 610 a short exposure image (e.g., a still image or a frame of video) that was captured using an image sensor (e.g., the one or more image sensors 314 or the one or more image sensors 342). The image sensor may be part of an image capture device (e.g., the image capture device 100, the image capture device 200, the image capture device 310, or the image capture device 340). For example, the short exposure image may be received 610 from the image sensor via a bus (e.g., the bus 324). In some implementations, the short exposure image may be received 610 via a communications link (e.g., the communications link 350). For example, the short exposure image may be received 610 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the short exposure image may be received 610 via communications interface 366. For example, the short exposure image may be received 610 via a front ISP that performs some initial processing on the received 610 image. For example, the short exposure image may represent each pixel value in a defined format, such as in a RAW image signal format, a YUV image signal format, or a compressed format (e.g., an MPEG or JPEG compressed bitstream). For example, the short exposure image may be stored in a format using the Bayer color mosaic pattern. In some implementations, the short exposure image may be a frame of video. In some implementations, the short exposure image received 610 is a combined image composed of multiple images from multiple respective image sensors that have been stitched together to form the combined image with a shared field of view.

The process 600 includes receiving 620 a long exposure image (e.g., a still image or a frame of video) that was captured using the image sensor. The long exposure image may be captured with a longer exposure time than the short exposure image. For example, the image sensor may be digital overlap high dynamic range (DOL-HDR) sensor. In some implementations, the image sensor is a digital overlap high dynamic range sensor, and receiving 610 the short exposure image and receiving 620 the long exposure image includes receiving the short exposure image and the long exposure image in an interleaved pattern of image portions, such that exposure of an image portion of the long exposure image commences when pixels of a same image portion of the short exposure image are read and reset. For example, an exposure period of the short exposure image may be adjacent in time to an exposure period of the long exposure image, which may server to eliminate or mitigate blur and/or ghosting in an output image determined based on the short exposure image and the long exposure image. For example, the image portion may be a row of pixels, set of rows of pixels, or a block of pixels. For example, the long exposure image may be received 620 from the image sensor via a bus (e.g., the bus 324). In some implementations, the long exposure image may be received 620 via a communications link (e.g., the communications link 350). For example, the long exposure image may be received 620 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the long exposure image may be received 620 via communications interface 366. For example, the long exposure image may be received 620 via a front ISP that performs some initial processing on the received image. For example, the long exposure image may represent each pixel value in a defined format, such as in a RAW image signal format, a YUV image signal format, or a compressed format (e.g., an MPEG or JPEG compressed bitstream). For example, the long exposure image may be stored in a format using the Bayer color mosaic pattern. In some implementations, the long exposure image may be a frame of video. In some implementations, the long exposure image received 620 is a combined image composed of multiple images from multiple respective image sensors that have been stitched together to form the combined image with a shared field of view.

The process 600 includes receiving 630 an angular rate measurement captured using an angular rate sensor (e.g., the angular rate sensor 316 or the angular rate sensor 344) attached to the image sensor during exposure of the long exposure image. For example, angular rate sensor may output angular rate measurements (e.g., three-axis angular rate measurements in degrees per second) or measurement data from which angular rate measurements can be derived (e.g., quaternions representing an instantaneous estimate of an orientation or pose of image capture device including the image sensors). The angular rate sensor may be part of an image capture device (e.g., the image capture device 100, the image capture device 200, the image capture device 310, or the image capture device 340). For example, the angular rate measurement may be received 630 from the angular rate sensor via a bus (e.g., the bus 324). In some implementations, the angular rate measurement may be received 630 via a communications link (e.g., the communications link 350). For example, the angular rate measurement may be received 630 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the angular rate measurement may be received 630 via communications interface 366.

The process 600 includes determining 640, based on the angular rate measurement, whether to apply high dynamic range processing to an image portion of the short exposure image and the long exposure image. For example, the image portion may be a block of one or more pixels that corresponds to less than a whole image. In some implementations, the image portion corresponds to a whole image, and the determination of whether to apply high dynamic range processing is for the whole image. For example, determining 640 whether to apply high dynamic range processing may include determining a blur metric for the image portion based on the angular rate measurement; comparing the blur metric to a threshold; and, responsive to the blur metric exceeding the threshold, determining not to apply high dynamic range processing to the image portion. In some implementations, the threshold may depend on the exposure time of the long exposure image. For example, the threshold may be inversely proportional to the exposure time of the long exposure image. In implementations, the blur metric for an image portion depends on orientation and/or position of one or more pixels of the image portion in relation to an axis of rotation for a rotation of the image sensor reflected in the angular rate measurement. For example, the blur metric may be proportional to the distance of one or more pixels of the image portion from the axis of rotation. In some implementations, the long exposure image is captured using an electronic rolling shutter (ERS), and the blur metric varies with the ERS region. In some implementations, the blur metric for an image portion (e.g., a block of pixels or a whole image) may be determined as an average of blur metrics for respective pixels in the image portion, which may vary based on ERS region. For example, the process 700 of FIG. 7 may be implemented to determine 640, based on the angular rate measurement, whether to apply high dynamic range processing to one or more image portions of the short exposure image and the long exposure image.

When (at operation 645) it has been determined 640 to apply high dynamic range processing to the image portion, the process 600 includes, responsive to a determination to apply high dynamic range processing to the image portion, applying 650 high dynamic range processing to combine the image portion of the short exposure image with the image portion of the long exposure image based on pixel values in the image portion of the long exposure image. For example, pixels of the long exposure image that are saturated may be replaced by corresponding pixels of the short exposure image in the output image, and pixels of the output image may be determined based on corresponding pixels of the long exposure image where those pixels of the long exposure image are not saturated.

When (at operation 645) it has been determined 640 not to apply high dynamic range processing to the image portion, the process 600 includes, responsive to a determination not to apply high dynamic range processing to the image portion, selecting 660 the image portion of the short exposure image for use as the image portion of an output image and discard the image portion of the long exposure image. For example, the short exposure image may be used in lieu of an HDR combination of the short exposure image with the long exposure image where the blur in the long exposure image is determined to be too great. This may serve to mitigate or prevent blur and/or ghosting distortion in the output image.

When (at operation 665) there are more image portions to process, the process 600 includes determining 640, based on the angular rate measurement, whether to apply high dynamic range processing to the next image portion of the short exposure image and the long exposure image. For example, the process 600 may iterate through all the image portions (e.g., blocks of pixels) of the images.

When (at operation 665) there are no more image portions to process, the process 600 includes transmitting, storing, or displaying 670 an image based on the output image. For example, the image may be transmitted 670 to an external device (e.g., a personal computing device) for display or storage. For example, the image may be the same as the output image. For example, the image may be a composite image determined by stitching an image based on the output image to one or more images from other image sensors with overlapping fields of view. For example, the image may be compressed using an encoder (e.g., an MPEG encoder). For example, the image may be transmitted 670 via the communications interface 318. For example, the image may be displayed 670 in the user interface 320 or in the user interface 364. For example, the image may be stored 670 in memory of the processing apparatus 312 or in memory of the processing apparatus 362.

Figure 7:
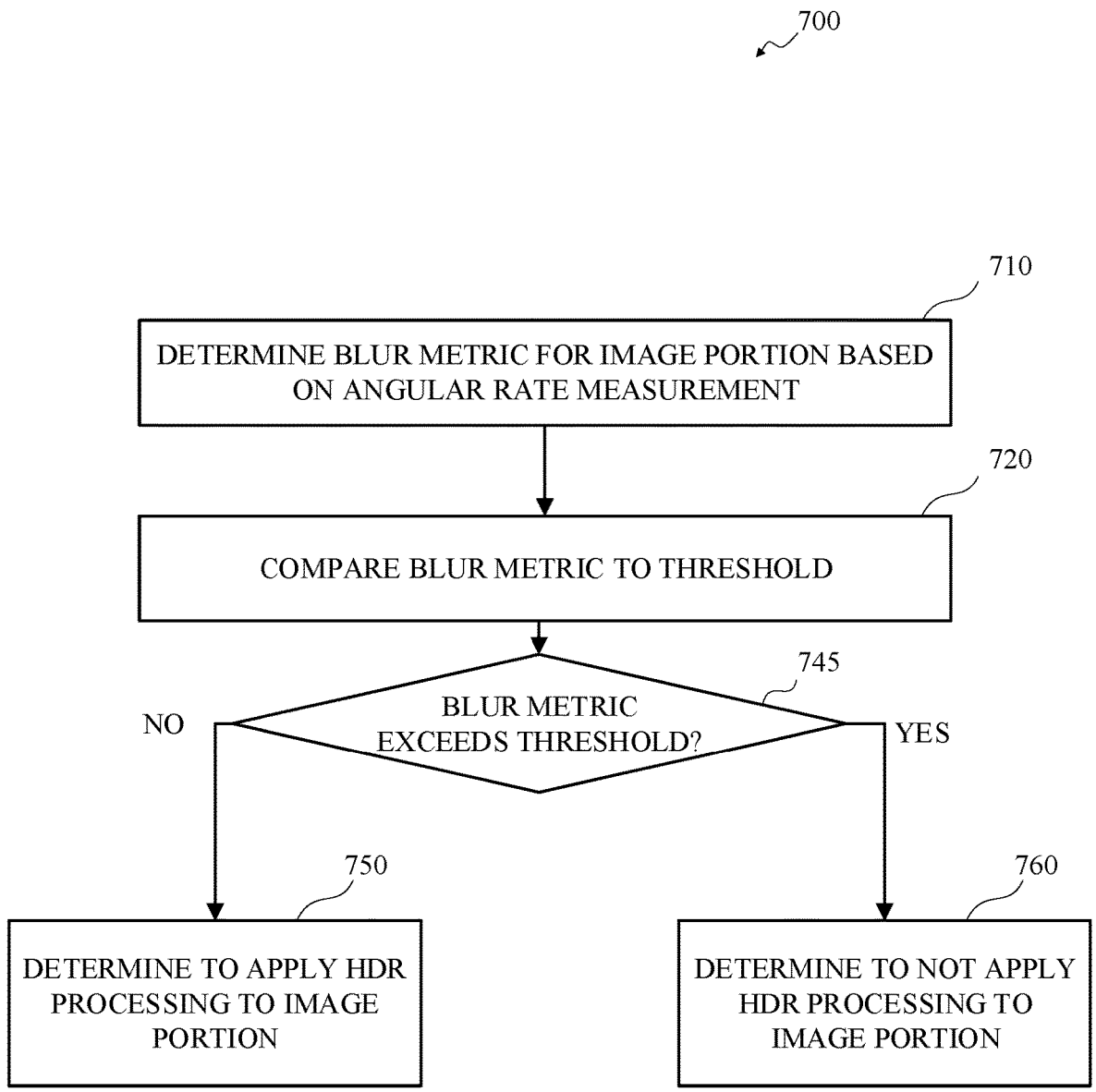
FIG. 7 is flowchart of an example of a process for determining whether to apply high dynamic range processing to an image portion.

FIG. 7 is flowchart of an example of a process 700 for determining whether to apply high dynamic range processing to an image portion. The process 700 includes determining 710 a blur metric for the image portion based on the angular rate measurement; comparing 720 the blur metric to a threshold; and, responsive to the blur metric not exceeding the threshold, determining 750 to apply high dynamic range processing to the image portion, or, responsive to the blur metric exceeding the threshold, determining 760 not to apply high dynamic range processing to the image portion. For example, the process 700 may be implemented using the image capture system 300 of FIG. 3A. For example, the process 700 may be implemented using the image capture system 330 of FIG. 3B. For example, the process 700 may be implemented using the system 400 of FIG. 4.

The process 700 includes determining 710 a blur metric for the image portion based on the angular rate measurement. In some implementations, the blur metric for the image portion may depend on orientation and/or position of one or more pixels of the image portion in relation to an axis of rotation for a rotation of the image sensor reflected in the angular rate measurement. For example, the blur metric may be proportional to the distance of one or more pixels of the image portion from the axis of rotation. For example, the blur metric may be determined according to b=a*d*sin (t*m), where b is the blur metric for the image portion, a is a constant, d is an average distance of pixels of the image portion and from an axis of rotation for the image sensor determined based on the angular rate measurement, t is a constant, and m is the magnitude of an angular rate measurement applicable to the image portion. In some implementations, the long exposure image is captured using an electronic rolling shutter (ERS), and the blur metric varies with the ERS region. In some implementations, the blur metric for an image portion (e.g., a block of pixels or a whole image) may be determined as an average of blur metrics for respective pixels in the image portion, which may vary based on ERS region.

The process 700 includes comparing 720 the blur metric to a threshold. In some implementations, the threshold depends on an exposure duration of the long exposure image. For example, the threshold may be inversely proportional to the exposure time of the long exposure image.

When (at operation 745) the blur metric does not exceed the threshold, the process 700 includes, determining 750 to apply high dynamic range processing to the image portion.

When (at operation 745) the blur metric does exceed the threshold, the process 700 includes, responsive to the blur metric exceeding the threshold, determining 760 not to apply high dynamic range processing to the image portion.

FIG. 8 is flowchart of an example of a process 800 for selecting an exposure duration based on angular rate measurements. The process 800 includes receiving 810 a short exposure image that was captured using an image sensor; receiving 820 a long exposure image that was captured using the image sensor; receiving 830 an angular rate measurement captured using an angular rate sensor during exposure of the long exposure image; selecting 840, based on the angular rate measurement, whether to use an image portion of the short exposure image or the long exposure image; and determining 850 the image portion of an output image based on the image portion of the selected image. For example, the selection of an input image may be made for one or more image portions (e.g., pixels or blocks of pixels) of the images. The process 800 includes transmitting, storing, or displaying 870 an image based on the output image. For example, the process 600 may be implemented using the image capture system 300 of FIG. 3A. For example, the process 600 may be implemented using the image capture system 330 of FIG. 3B. For example, the process 600 may be implemented using the system 400 of FIG. 4.

The process 800 includes receiving 810 a short exposure image (e.g., a still image or a frame of video) that was captured using an image sensor (e.g., the one or more image sensors 314 or the one or more image sensors 342). The image sensor may be part of an image capture device (e.g., the image capture device 100, the image capture device 200, the image capture device 310, or the image capture device 340). For example, the short exposure image may be received 810 from the image sensor via a bus (e.g., the bus 324). In some implementations, the short exposure image may be received 810 via a communications link (e.g., the communications link 350). For example, the short exposure image may be received 810 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the short exposure image may be received 810 via communications interface 366. For example, the short exposure image may be received 810 via a front ISP that performs some initial processing on the received 810 image. For example, the short exposure image may represent each pixel value in a defined format, such as in a RAW image signal format, a YUV image signal format, or a compressed format (e.g., an MPEG or JPEG compressed bitstream). For example, the short exposure image may be stored in a format using the Bayer color mosaic pattern. In some implementations, the short exposure image may be a frame of video. In some implementations, the short exposure image received 810 is a combined image composed of multiple images from multiple respective image sensors that have been stitched together to form the combined image with a shared field of view.

The process 800 includes receiving 820 a long exposure image (e.g., a still image or a frame of video) that was captured using the image sensor. The long exposure image may be captured with a longer exposure time than the short exposure image. For example, the image sensor may be digital overlap high dynamic range (DOL-HDR) sensor. In some implementations, the image sensor is a digital overlap high dynamic range sensor, and receiving 810 the short exposure image and receiving 820 the long exposure image includes receiving the short exposure image and the long exposure image in an interleaved pattern of image portions, such that exposure of an image portion of the long exposure image commences when pixels of a same image portion of the short exposure image are read and reset. For example, an exposure period of the short exposure image may be adjacent in time to an exposure period of the long exposure image, which may server to eliminate or mitigate blur and/or ghosting in an output image determined based on the short exposure image and the long exposure image. For example, the image portion may be a row of pixels, set of rows of pixels, or a block of pixels. For example, the long exposure image may be received 820 from the image sensor via a bus (e.g., the bus 324). In some implementations, the long exposure image may be received 820 via a communications link (e.g., the communications link 350). For example, the long exposure image may be received 820 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the long exposure image may be received 820 via communications interface 366. For example, the long exposure image may be received 820 via a front ISP that performs some initial processing on the received image. For example, the long exposure image may represent each pixel value in a defined format, such as in a RAW image signal format, a YUV image signal format, or a compressed format (e.g., an MPEG or JPEG compressed bitstream). For example, the long exposure image may be stored in a format using the Bayer color mosaic pattern. In some implementations, the long exposure image may be a frame of video. In some implementations, the long exposure image received 820 is a combined image composed of multiple images from multiple respective image sensors that have been stitched together to form the combined image with a shared field of view.

The process 800 includes receiving 830 an angular rate measurement captured using an angular rate sensor (e.g., the angular rate sensor 316 or the angular rate sensor 344) attached to the image sensor during exposure of the long exposure image. For example, angular rate sensor may output angular rate measurements (e.g., three-axis angular rate measurements in degrees per second) or measurement data from which angular rate measurements can be derived (e.g., quaternions representing an instantaneous estimate of an orientation or pose of image capture device including the image sensors). The angular rate sensor may be part of an image capture device (e.g., the image capture device 100, the image capture device 200, the image capture device 310, or the image capture device 340). For example, the angular rate measurement may be received 830 from the angular sensor via a bus (e.g., the bus 324). In some implementations, the angular rate measurement may be received 830 via a communications link (e.g., the communications link 350). For example, the angular rate measurement may be received 830 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the angular rate measurement may be received 830 via communications interface 366.

The process 800 includes selecting 840, based on the angular rate measurement, whether to use an image portion (e.g., a pixel or a block of pixels) of the short exposure image or the long exposure image. In some implementations, the image portion is a block of one or more pixels that corresponds to less than a whole image. In some implementations, the image portion corresponds to a whole image (e.g., the selection is made globally for the whole image). For example, selecting 840 between the short exposure image and the long exposure image may include determining a blur metric for the image portion based on the angular rate measurement, determining a noise estimate for the image portion of the short exposure image, comparing the blur metric to the noise estimate, and, based on comparison of the blur metric and the noise estimate, selecting the short exposure image (or the long exposure image) for use in the image portion of the output image. In some implementations, the noise estimate depends on an exposure duration of the short exposure image and one or more pixel values of the image portion of the short exposure image. For example, the process 900 of FIG. 9 may be implemented to select 840, based on the angular rate measurement, whether to use an image portion of the short exposure image or the long exposure image.

The process 800 includes determining 850 the image portion of an output image based on the image portion of the selected 840 image. For example, the image portion of the selected 840 image may be copied to the corresponding image portion of the output image. In some implementations, the image portion of the selected 840 image may be subjected to image processing (e.g., e.g., gain adjustment and/or downscaling) to determine 850 the image portion of the output image.

When (at operation 855) there are more image portions to process, the process 800 includes selecting 840, based on the angular rate measurement, whether to use the next image portion of the short exposure image or the long exposure image. For example, the process 800 may iterate through all the image portions (e.g., blocks of pixels) of the images.

When (at operation 855) there are no more image portions to process, the process 800 includes transmitting, storing, or displaying 870 an image based on the output image. For example, the image may be transmitted 870 to an external device (e.g., a personal computing device) for display or storage. For example, the image may be the same as the output image. For example, the image may be a composite image determined by stitching an image based on the output image to one or more images from other image sensors with overlapping fields of view. For example, the image may be compressed using an encoder (e.g., an MPEG encoder). For example, the image may be transmitted 870 via the communications interface 318. For example, the image may be displayed 870 in the user interface 320 or in the user interface 364. For example, the image may be stored 870 in memory of the processing apparatus 312 or in memory of the processing apparatus 362.

Figure 9:
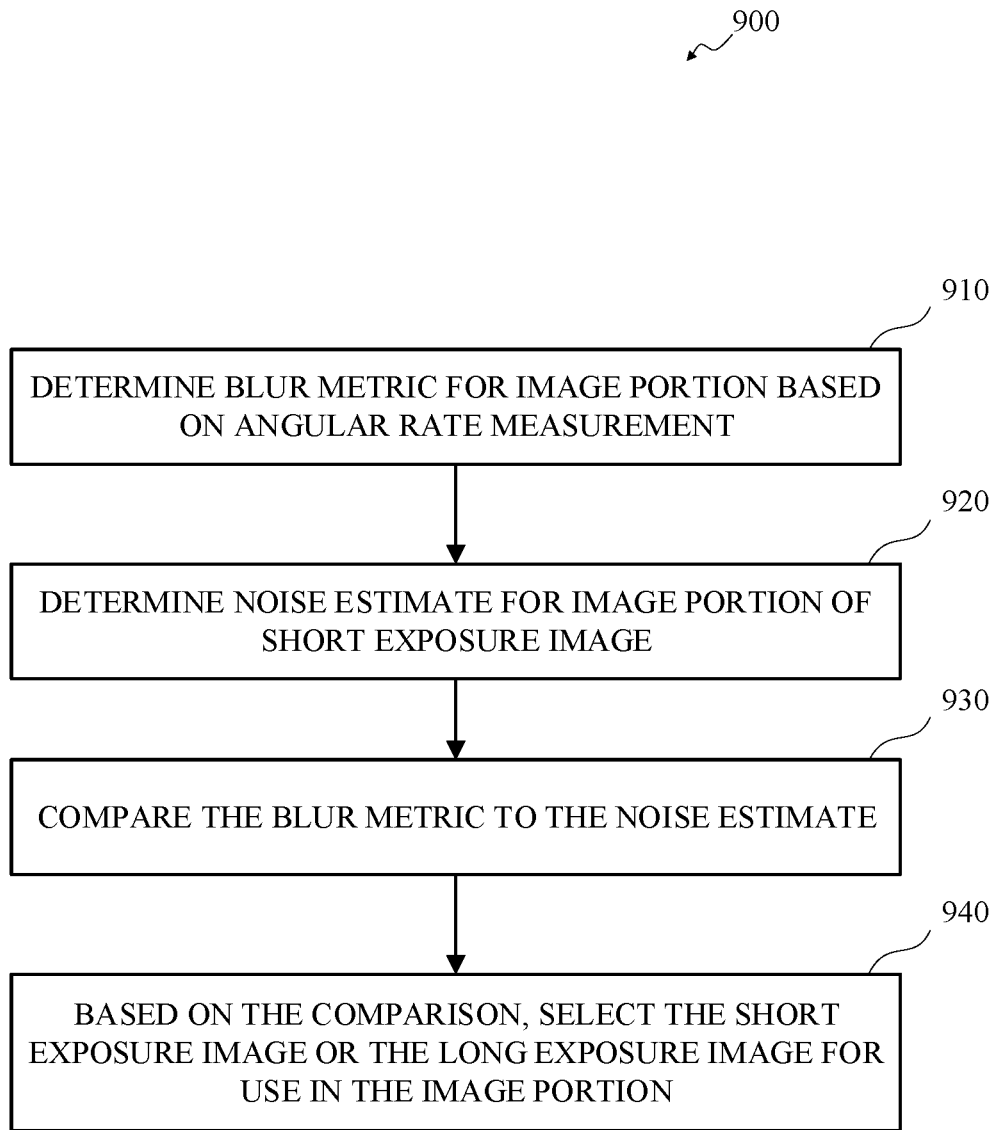
FIG. 9 is flowchart of an example of a process for selecting an image portion from short exposure image or a long exposure image.

FIG. 9 is flowchart of an example of a process 900 for selecting an image portion from short exposure image or a long exposure image. The process 900 includes determining 910 a blur metric for the image portion based on the angular rate measurement; determining 920 a noise estimate for the image portion of the short exposure image; comparing 930 the blur metric to the noise estimate; and, based on comparison of the blur metric and the noise estimate, selecting 940 the short exposure image for use in the image portion. For example, the process 900 may be implemented using the image capture system 300 of FIG. 3A. For example, the process 900 may be implemented using the image capture system 330 of FIG. 3B. For example, the process 900 may be implemented using the system 400 of FIG. 4.

The process 900 includes determining 910 a blur metric for the image portion (e.g., a pixel or a block of pixels) based on the angular rate measurement. In some implementations, the blur metric for the image portion may depend on orientation and/or position of one or more pixels of the image portion in relation to an axis of rotation for a rotation of the image sensor reflected in the angular rate measurement. For example, the blur metric may be proportional to the distance of one or more pixels of the image portion from the axis of rotation. For example, the blur metric may be determined according to $b=a*d*\sin(t*m)$, where b is the blur metric for the image portion, a is a constant, d is an average distance of pixels of the image portion and from an axis of rotation for the image sensor determined based on the angular rate measurement, t is a constant, and m is the magnitude of an angular rate measurement applicable to the image portion. In some implementations, the long exposure image is captured using an electronic rolling shutter (ERS), and the blur metric varies with the ERS region. In some implementations, the blur metric for an image portion (e.g., a block of pixels or a whole image) may be determined as an average of blur metrics for respective pixels in the image portion, which may vary based on ERS region.

The process 900 includes determining 920 a noise estimate for the image portion of the short exposure image. In some implementations, the noise estimate depends on an exposure duration of the short exposure image and one or more pixel values of the image portion of the short exposure image. For example, the noise estimate may be proportional to an average of the pixel values in the image portion. For example, the noise estimate may be inversely proportional to the exposure duration of the short exposure image.

The process 900 includes comparing 930 the blur metric to the noise estimate. For example, comparing 930 the blur metric and the noise estimate may include determining a difference or a ratio between a term that depends on (e.g., is proportional to) the blur metric and a term that depends on (e.g., is proportional to) the noise estimate.

The process 900 includes, based on comparison of the blur metric and the noise estimate, selecting 940 the short exposure image (or the long exposure image) for use in the image portion. For example, where the comparison indicates that blur from motion of the image sensor during capture of the long exposure image would result in more significant image distortion than sensor noise in the short exposure image, then the short exposure image may be selected 940 for use in the image portion (e.g., a block of pixels or the whole image). For example, where the comparison indicates that blur from motion of the image sensor during capture of the long exposure image would result in less significant image distortion than sensor noise in the short exposure image, then the long exposure image may be selected 940 for use in the image portion (e.g., a block of pixels or the whole image).

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. For example, a non-transitory computer-readable storage medium may include executable instructions that, when executed by a processor, cause performance of an operations to implement the process 600 of FIG. 6 or the process 800 of FIG. 8.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   selecting whether to use an image portion of a short exposure image or a long exposure image based on an angular rate measurement captured using an angular rate sensor during exposure of the long exposure image, wherein the long exposure image was captured with a longer exposure time than the short exposure image;
   determining the image portion of an output image based on the image portion of the selected image; and
   transmitting, storing, or displaying an image based on the output image.

2. The method of claim 1, in which selecting, based on the angular rate measurement, whether to use an image portion of the short exposure image or the long exposure image comprises:
   determining a blur metric for the image portion based on the angular rate measurement;
   determining a noise estimate for the image portion of the short exposure image;
   comparing the blur metric to the noise estimate; and
   based on the comparison of the blur metric to the noise estimate, selecting the short exposure image for use in the image portion.

3. The method of claim 2, in which the noise estimate depends on an exposure duration of the short exposure image and one or more pixel values of the image portion of the short exposure image.

4. The method of claim 1, in which the image portion is a block of one or more pixels that corresponds to less than a whole image.

5. The method of claim 1, in which the image portion corresponds to a whole image.

6. A system comprising:
   an image sensor configured to capture images;
   an angular rate sensor that is configured to measure changes in orientation of the image sensor; and
   a processing apparatus configured to:
      determine whether to apply high dynamic range processing to an image portion of a short exposure image and a long exposure image captured using the image sensor based on an angular rate measurement captured using the angular rate sensor during exposure of the long exposure image, wherein the long exposure image was captured with a longer exposure time than the short exposure image; and
      responsive to a determination not to apply high dynamic range processing to the image portion, select the image portion of the short exposure image for use as the image portion of an output image and discard the image portion of the long exposure image.

7. The system of claim 6, in which the processing apparatus is configured to:
transmit, store, or display an image based on the output image.

8. The system of claim 6, in which the processing apparatus is configured to determine, based on the angular rate measurement, whether to apply high dynamic range processing by performing operations comprising:
determining a blur metric for the image portion based on the angular rate measurement;
comparing the blur metric to a threshold; and
responsive to the blur metric exceeding the threshold, determining not to apply high dynamic range processing to the image portion.

9. The system of claim 8, in which the threshold depends on an exposure duration of the long exposure image.

10. The system of claim 8, in which the blur metric for the image portion is determined as an average of blur metrics for respective pixels in the image portion.

11. The system of claim 6, in which the image portion is a block of one or more pixels that corresponds to less than a whole image.

12. The system of claim 6, in which the image portion corresponds to a whole image, and the determination of whether to apply high dynamic range processing is for the whole image.

13. The system of claim 6, in which the processing apparatus is attached to the image sensor.

14. A method comprising:
determining whether to apply high dynamic range processing to an image portion of a short exposure image and a long exposure image based on an angular rate measurement captured using an angular rate sensor during exposure of the long exposure image, wherein the long exposure image was captured with a longer exposure time than the short exposure image;
responsive to a determination to apply high dynamic range processing to the image portion, applying high dynamic range processing to combine the image portion of the short exposure image with the image portion of the long exposure image based on pixel values in the image portion of the long exposure image to obtain the image portion of an output image; and
transmitting, storing, or displaying an image based on the output image.

15. The method of claim 14, in which determining, based on the angular rate measurement, whether to apply high dynamic range processing comprises:
determining a blur metric for the image portion based on the angular rate measurement;
comparing the blur metric to a threshold; and
responsive to the blur metric exceeding the threshold, determining not to apply high dynamic range processing to the image portion.

16. The method of claim 15, in which the threshold depends on an exposure duration of the long exposure image.

17. The method of claim 15, in which the blur metric for the image portion is determined as an average of blur metrics for respective pixels in the image portion.

18. The method of claim 14, in which the image portion corresponds to a whole image, and the determination of whether to apply high dynamic range processing is for the whole image.

19. The method of claim 14, in which the image portion is a first image portion, comprising:
determining, based on the angular rate measurement, whether to apply high dynamic range processing to a second image portion of the short exposure image and the long exposure image; and
responsive to a determination not to apply high dynamic range processing to the second image portion, select the second image portion of the short exposure image for use as the second image portion of the output image and discard the second image portion of the long exposure image.

20. The method of claim 14, in which the image portion is a block of one or more pixels that corresponds to less than a whole image.

\* \* \* \* \*

UNITED STATES PATENT AND TRADEMARK OFFICE
CERTIFICATE OF CORRECTION

| | | |
|---|---|---|
| PATENT NO. | : 11,812,159 B2 | Page 1 of 1 |
| APPLICATION NO. | : 17/951630 | |
| DATED | : November 7, 2023 | |
| INVENTOR(S) | : Bruno César Douady and Hervé Hornung | |

It is certified that error appears in the above-identified patent and that said Letters Patent is hereby corrected as shown below:

On the Title Page

Item (57) In the Abstract, Line 1:
Replace "rate" with --range--

In the Specification

Column 1, Line 19:
Replace "rate" with --range--

Column 1, Line 39:
Replace "rate" with --range--

Column 3, Line 45:
Replace "rate" with --range--

Signed and Sealed this
Twenty-fourth Day of June, 2025

Coke Morgan Stewart
*Acting Director of the United States Patent and Trademark Office*